United States Patent

Hintermayer

[11] Patent Number: 5,998,319
[45] Date of Patent: Dec. 7, 1999

[54] METHOD OF PRODUCING SINTERED SILICON NITRIDE

[75] Inventor: Jochen Hintermayer, Trostberg, Germany

[73] Assignee: SKW Trostberg Aktiengesellschaft, Germany

[21] Appl. No.: 09/077,738

[22] PCT Filed: Dec. 12, 1996

[86] PCT No.: PCT/EP96/05571

§ 371 Date: Jun. 10, 1998

§ 102(e) Date: Jun. 10, 1998

[87] PCT Pub. No.: WO97/21644

PCT Pub. Date: Jun. 19, 1997

[30] Foreign Application Priority Data

Dec. 12, 1995 [DE] Germany .................. 195 45 238

[51] Int. Cl.$^6$ ................................ C04B 35/587
[52] U.S. Cl. .................. 501/97.1; 501/32; 501/97.2; 264/683
[58] Field of Search ................ 501/97.1, 97.2, 501/32; 264/683

[56] References Cited

U.S. PATENT DOCUMENTS 5,098,872  3/1992  Suyama et al. .................. 501/97.2
5,160,508  11/1992 Pyzik et al. ..................... 501/97.2
5,256,603  10/1993 Andrus et al. .................... 501/32
5,358,912  10/1994 Freitag et al. .................... 501/97.2
5,523,268  6/1996  Ukyo et al. ...................... 501/97.2

*Primary Examiner*—Karl Group
*Attorney, Agent, or Firm*—Fulbright & Jaworski, LLP

[57] ABSTRACT

By providing a new method of producing sintered silicon nitride, this invention takes into account the fact that parts made of $Si_3N_4$ are often used in temperature ranges below 1200° C. and sometimes even below 500° C. and therefore needn't be designed to withstand temperatures above 1200° C. The sintered silicon nitride for these low-temperature applications is obtained by sintering silicon nitride powder of <2 μm with 5 to 20 wt. % of one or more glass components of the same particle size at temperatures below 1400° C. It is a prerequisite that the glass components used, preferably alkali metal borate glasses with a coefficient of thermal expansion α which matches that of $Si_3N_4$, have a transformation point $T_g$ which is below 750° C., and that the individual glass components have a free enthalpy ΔG which is at least 60% of the free enthalpy of $SiO_2$. For low-temperature applications, $Si_3N_4$ parts manufactured cost-effectively in this way fully satisfy the demands made on them in respect of density, strength and β-phase proportion.

10 Claims, No Drawings

METHOD OF PRODUCING SINTERED SILICON NITRIDE

SPECIFICATION

On account of its excellent material properties, silicon nitride is used in many fields of engineering. However, its use for mass-production purposes involving large numbers of parts has hitherto not been possible, because $Si_3N_4$ parts are extremely expensive to manufacture.

This is mainly due to the sintering conditions required to compact the material during the last stage of the manufacturing process. As a rule, silicon nitride is intended for applications involving high temperatures of up to 1200° C. and sometimes even 1400° C. This means, however, that the oxidic binding phase—typically a glass phase—used for sintering must have a transformation point $T_g$ which is above 1000° C. The physical characteristic $T_g$, which is a measure of the stability of the solidified glass mass, marks the transition temperature at which the viscosity of the glass—usually under pressure—begins to decrease.

Since the sintering step cannot be carried out until the viscosity of the glass phase is sufficiently low, a temperature in the range between 1750 and 2000° C. is needed. An optimal sintering process thus requires a very high energy input. Additional important requirements include use of an inert atmosphere of very high quality, necessitating a hermetically sealed furnace, and encapsulation of the green compact in $Si_3N_4$ powder. In many cases it is moreover necessary to use a glass phase which consists of expensive oxides such as those of the rare earth metals. Besides this, the quality of the sintered product is significantly impaired if the temperature gradient in the furnace is not kept as small as possible, and this often necessitates use of a sophisticated control means. All in all, the sintering of silicon nitride materials is thus a very cost-intensive process.

When one looks at the conditions under which different silicon nitride components are actually used, however, it turns out that in many cases maximum temperatures do not exceed 750° C. and in numerous cases are even below 300° C. In spite of this, parts intended for these low temperature ranges have so far also been sintered under the conditions described previously, which can sometimes only be met at great expense.

The object of the invention was thus to provide a simple and cost-effective method of producing sintered silicon nitride for low-temperature applications. The method is intended to allow the production of $Si_3N_4$—based material which is suitable for use at temperatures below 750° C. from silicon nitride powder with a particle size of <2 μm and a glass phase or the components thereof, each with a particle size of <2 μm. The sintered material is obtained without requiring a high energy input or complicated technical equipment, and is accordingly suitable for economical mass production applications.

The object is established by adding 5–20 wt. % or preferably 5–15 wt. % of one or more glass phases to the silicon nitride powder, the transformation point $T_g$ of the particular glass phase being below 750° C., and by sintering the glass phase(s) with the silicon nitride powder at a temperature below 1400° C.

In the method of the invention the glass phases can be added as such to the silicon nitride powder. It is also possible, however, to add the components of the glass phases individually. Typical glass phase components include $SiO_2$, $Al_2O_3$, $B_2O_3$, alkali metal oxides such as $Li_2O$, $Na_2O$ or $K_2O$ and alkaline earth metal oxides such as MgO and CaO.

There may, of course, be other components too, provided that the transformation point $T_g$ of the glass phase does not exceed 750° C.

The transformation points $T_g$ of the individual glass components (eg, $SiO_2$, $Al_2O_3$) may by all means be well above 1500° C. What is crucial for the invention is that the transformation point $T_g$ of the phase components in their entirety does not exceed 750° C.

Surprisingly, it turned out that the production method according to the invention not only renders the aforementioned, cost-intensive conditions largely unnecessary, but also that it is possible to sinter at astonishingly low pressures, eg, of <10 bar. This makes the method even more cost effective. In addition, material qualities are achieved which, with respect to fracture resistance, densities and β-phase proportions of the silicon nitride, more than satisfy the requirements, especially for low-temperature applications in the range <750° C.

It is important that the glass components used have a coefficient of thermal expansion which matches that of $Si_3N_4$. According to a preferred embodiment of the invention, therefore, the linear coefficient of thermal expansion a of the glass phase used is between $2.5 \times 10^{-6} K^{-1}$ and $7.0 \times 10^{-6} K^{-1}$ for the temperature range below 300° C.

Besides this, it is also beneficial if the glass phase(s) is/are made up predominantly of oxidic components each of which has a free enthalpy ΔG (free energy of formation from the elements at 298 K) which amounts to at least 60% of the free enthalpy of $SiO_2$ at the sintering temperature of the invention, ie, below 1400° C. The corresponding enthalpy values are contained in "Thermochemical properties of inorganic substances", I. Barin, O. Knacke, publishing house Springer, 1973; on account of this reference, they constitute a component of this application. This requirement of the invention is met, eg, by using alkali borate glasses, especially lithium borate glasses with proportions of $B_2O_3$ between 65 and 75 wt. % and of $Li_2O$ between 25 and 35 wt. %. Generally speaking, however, boron silicate glasses are also suitable. For the method of the invention, glass phases with a transformation point $T_g$ below 550° C. have proved particularly suitable.

Typically, the sintered material is made by grinding silicon nitride powder with the glass components (eg, $SiO_2$, $B_2O_3$ and $Na_2O$) or with crushed glass fragments in water by means of an agitator ball mill to obtain a surface area of at least 12 m²/g BET (Brunnauer-Emmet-Teller), which corresponds to a commonly used particle size of <2 μm, or, alternatively, mixing the two powdered components—each of which has the required particle size of <2 μm—in dry form, and by then making a granulate from the powder mixture which is obtained in both cases. The granulate is subsequently pressed to form a green compact which is sintered in a nitrogen or other suitable protective gas atmosphere in the temperature range characteristic of the invention, ie, below 1400° C., preferably in the range between 1000 and 1300° C.

For the transition of the α phase of the $Si_3N_4$ to the β phase, the invention provides for a sintering duration of preferably 15 to 120 minutes.

In this way one obtains very strong, dense parts which, depending on the glass phase used and the specified requirements, are highly suitable for a great variety of applications at temperatures generally below 750° C. or markedly lower. Sintered silicon nitride produced in this way is preferably used for applications involving temperatures up to 750° C.; where use is made of alkali metal borate glasses, preferably up to 200° C. The sintered material is suitable, eg, for wearing-component applications or ball bearings.

rupture test pieces were worked from sintered parts. Strength was determined by means of a 4-point bending test, $\sigma_{4b}$, distance between supports 40/20 mm.

| Exp. no. | Si$_3$N$_4$ type (Silzot ®) [wt. %] | Glass type [wt. %] | Sintering duration [min] | Sintering temp. [° C.] | Density [%] | Strength [MPa] | β - phase [wt. %] |
|---|---|---|---|---|---|---|---|
| 1 | HQ:85 | 8487:15 | 60 | 1200 | 98 | 770 | 80 |
| 2 | 7038:85 | Duran:15 | 45 | 1300 | 98 | 790 | 85 |
| 3 | HQ:87 | 7251:13 | 60 | 1320 | 99 | 810 | 90 |
| 4 | HQ:87 | 8487:13 | 60 | 1170 | 96 | 490 | 80 |

The subject matter of the invention thus also includes parts made of sintered silicon nitride, comprising silicon nitride and from 5 to 20 wt. %—relative to the weight of silicon nitride—of one or more glass phases, the glass phases having a transformation point $T_g$ below 750° C. and the density of the part being 95% of the maximum theoretical density. The strength of such parts is preferably >450 MPa, more preferably >600 MPa and most preferably >750 MPa. The parts contain β-silicon nitride in a proportion of preferably ≧80 wt. % relative to the total silicon nitride.

The following examples serve to illustrate more clearly the advantages of the method according to the invention.

EXAMPLES

The following components were used for the laboratory preparation of sintered silicon nitride:

| | Silicon nitride | |
|---|---|---|
| Proportions (wt. %) | Silzot ® 7038 | Silzot ® HQ |
| α-phase | ≧80 | ≧85 |
| Nitrogen | 38.5 | 38.7 |
| Oxygen | 0.7 | 0.65 |
| Other elements | <1.0 | <0.4 |

Silzot ®: Registered trademark, SKW Trostberg AG

| | Types of glass | | |
|---|---|---|---|
| Proportions (wt. %) | Schott 8427 | Schott Duran | Corning 7251 |
| SiO$_2$ | 75.1 | 79.7 | 78 |
| Al2O$_3$ | 1.3 | 3.1 | 2 |
| B$_2$O$_3$ | 16.7 | 10.3 | 15 |
| Na$_2$O | 4.3 | 5.2 | 5 |
| K$_2$O | 1.4 | unknown | unknown |
| MgO | 0.4 | 0.9 | unknown |
| CaO | 0.7 | 0.8 | unknown |
| Transformation point $T_g$ [° C.] | 523 | 568 | 543 |
| Working point WP [° C.] | 1 135 | 1 200 | 1 167 |
| Coeff. of expansion α [10$^{-6}$K$^{-1}$] | 4.0 | 3.2 | 3.7 |

Example 1

The two Silzot® types 7038 and HG were ground with powdered glass of the types Schott 8487, Schott Duran or Corning 7251 (see Table below) in water by means of an agitator ball mill to obtain a surface area of 12 m$^2$/g BET. Granulates were prepared from the powder mixtures and pressed to green compacts. These were then sintered at the temperatures indicated in a nitrogen atmosphere and under a pressure of 1200 mbar. In order to determine the parameters strength, density and proportion of βphase, transverse rupture test pieces were worked from sintered parts. Strength was determined by means of a 4-point bending test, $\sigma_{4b}$, distance between supports 40/20 mm.

Example 2

By means of an agitator ball mill, 87 wt. % Silzot® HQ were ground in water together with 13 wt. % of oxidic components corresponding to the glass composition Corning 7251 to obtain a surface area of 15 m$^2$/g BET. The rest of the procedure was the same as in Example 1. Sintering was carried out at 1250° C. for 60 minutes. The transverse rupture test pieces had a density which was 98% of the theoretical density, and a strength of 830 MPa. The proportion of β-phase was 85 wt. %.

Parts made according to Examples 1 and 2 can be used at temperatures up to a maximum of 500° C., eg, as intake valves in internal combustion engines for automobiles, because the transformation point $T_g$ of the glass phases used is above 500° C. in each case.

Example 3

85 wt. % of Silzot® 7038 was processed with 15 wt. % of an alkali borate glass consisting of 73 wt. % B$_2$O$_3$ and 27 wt. % Li$_2$O, using the same procedure as in Example 2. Sintering was carried out in a nitrogen atmosphere for 2 hours at 1000° C. The sintered part had a relative density of 98% and a bending strength of 625 MPa. Since the glass phase has a coefficient of thermal expansion α=7.0×10$^{-6}$ K$^{-1}$, which is considerably higher than that of silicon nitride (α=3.2×10$^{-6}$ K$^{-1}$), the sintered parts should in this case be restricted to applications involving maximum temperatures of about 200° C.

I claim:

1. A method of producing sintered silicon nitride comprising adding 5 to 20 wt % of at least one glass phase comprising at least one member selected from the group consisting of glass and glass components to silicon nitride to form a mixture, each of said silicon nitride, glass or glass components having a particle size of <2 μm, wherein the glass or glass components collectively have a transition point $T_g$ below 750° C., and sintering said mixture at a temperature below 1400° C. to form the sintered silicon nitride.

2. The method of claim 1, wherein each of said at least one glass phase collectively have a coefficient of thermal expansion to of from 2.5×10$^6$ K$^1$ and 7.0×10$^6$ K$^1$ at a temperature range below 300° C.

3. The method of claim 1 wherein each of said at least one glass phase collectively have a transformation point $T_g$ below 550° C.

4. The method of claim 1, wherein said at least one glass phase comprises a lithium borate glass.

5. The method of claim 4, wherein said lithium borate glass comprises 65 to 75 wt % B$_2$O$_3$ and 25 to 35 wt % Li$_2$O.

6. The method of claim 4, wherein said sintering is conducted at a temperature between 1000° C. and 1300° C.

7. The method of claim 1, wherein said sintering is conducted for 15 to 120 minutes.

8. The method of claim 1, wherein said at least one glass phase comprises alkali metal borate glass and wherein said sintering is conducted at a temperature of $\leq 750°$ C.

9. A sintered silicon nitride part having a maximum theoretical density comprising silicon nitride and 5 to 20 wt % of at least one glass phase comprising alkali metal borate glass, wherein collectively the at least one glass phase has a transformation point $T_g$ of less than 750° C., and wherein said sintered silicon nitride part has a density $\leq 95\%$ of said maximum theoretical density.

10. The sintered silicon nitride part of claim 9, wherein said part has a strength of >450 MPa.

* * * * *

UNITED STATES PATENT AND TRADEMARK OFFICE
CERTIFICATE OF CORRECTION

PATENT NO. : 5,998,319
DATED : Dec. 7, 1999
INVENTOR(S) : Jochen Hintermayer

It is certified that error appears in the above-indentified patent and that said Letters Patent is hereby corrected as shown below:

On the cover page, in the section entitled Foreign Application Priority Application, insert -- June 1982 Japan Hitachi 57,088,081 --.
On the cover page, in the section entitled Foreign Application Priority Application, change "195 45 238" to -- 195 45 238.6 --.
In column 2, line 24, change "a" to -- α --.
In column 2, line 36, after "alkali" insert -- metal --.

Signed and Sealed this

Twenty-seventh Day of March, 2001

Attest:

NICHOLAS P. GODICI

Attesting Officer

Acting Director of the United States Patent and Trademark Office